US010217366B2

(12) United States Patent
Cronin et al.

(10) Patent No.: US 10,217,366 B2
(45) Date of Patent: Feb. 26, 2019

(54) AUTONOMOUS RESORT SANITATION

(71) Applicant: PANASONIC INTELLECTUAL PROPERTY MANAGEMENT CO., LTD., Osaka (JP)

(72) Inventors: John Cronin, Bonita Springs, FL (US); Jonathan T. Goguen, Brookline, NH (US); Michael Glynn D'Andrea, Burlington, VT (US); Mikio Morioka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 44 days.

(21) Appl. No.: 15/473,041

(22) Filed: Mar. 29, 2017

(65) Prior Publication Data
US 2018/0286250 A1 Oct. 4, 2018

(51) Int. Cl.
| *G08G 1/00* | (2006.01) |
| *G06Q 50/12* | (2012.01) |
| *B65F 1/14* | (2006.01) |
| *G05D 1/00* | (2006.01) |
| *G07C 5/00* | (2006.01) |
| *G05D 1/02* | (2006.01) |
| *G08G 1/04* | (2006.01) |
| *G08G 1/127* | (2006.01) |
| *G06T 7/70* | (2017.01) |

(52) U.S. Cl.
CPC ............. *G08G 1/202* (2013.01); *B65F 1/14* (2013.01); *G05D 1/0011* (2013.01); *G05D 1/0212* (2013.01); *G06Q 50/12* (2013.01); *G06T 7/70* (2017.01); *G07C 5/008* (2013.01); *G08G 1/04* (2013.01); *G08G 1/127* (2013.01); *B65F 2210/1443* (2013.01); *B65F 2210/168* (2013.01)

(58) Field of Classification Search
CPC ........................................................ G08G 1/202
See application file for complete search history.

(56) References Cited

U.S. PATENT DOCUMENTS

| 8,798,786 B2 | 8/2014 | Wurman et al. |
| 9,606,543 B2 * | 3/2017 | Jeon ...................... G05D 1/0219 |
| 9,820,625 B2 * | 11/2017 | T P ...................... A47L 9/2826 |
| 2002/0108507 A1 | 8/2002 | May et al. |
| 2010/0322516 A1 * | 12/2010 | Xu ...................... G06K 9/00778 |
| | | 382/173 |
| 2014/0027868 A1 | 1/2014 | Ashida et al. |

(Continued)

*Primary Examiner* — Hussein Elchanti
*Assistant Examiner* — Michael A Berns
(74) *Attorney, Agent, or Firm* — McDermott Will & Emery LLP

(57) ABSTRACT

A waste management system and associated method are used to control routing of an autonomous waste receptacle in a facility. The autonomous waste receptacle includes a cavity for storing trash, a trash level sensor for sensing a level of trash stored therein, and a motor operative to move the waste receptacle. Position trackers sense positions of the autonomous waste receptacle and of patrons in the facility. Additionally, concession consumption concession consumption data indicative of sales performed by concessions in the facility are stored. A processing subsystem controls the waste receptacle to move autonomously in the facility along a route determined according to correlations between concession consumption data, trash levels monitored by the waste receptacle, and patron positions.

18 Claims, 10 Drawing Sheets

(56) References Cited

U.S. PATENT DOCUMENTS

2015/0298903 A1 10/2015 Luxford
2016/0005053 A1* 1/2016 Klima ................ G06Q 30/0201
 705/7.29

* cited by examiner

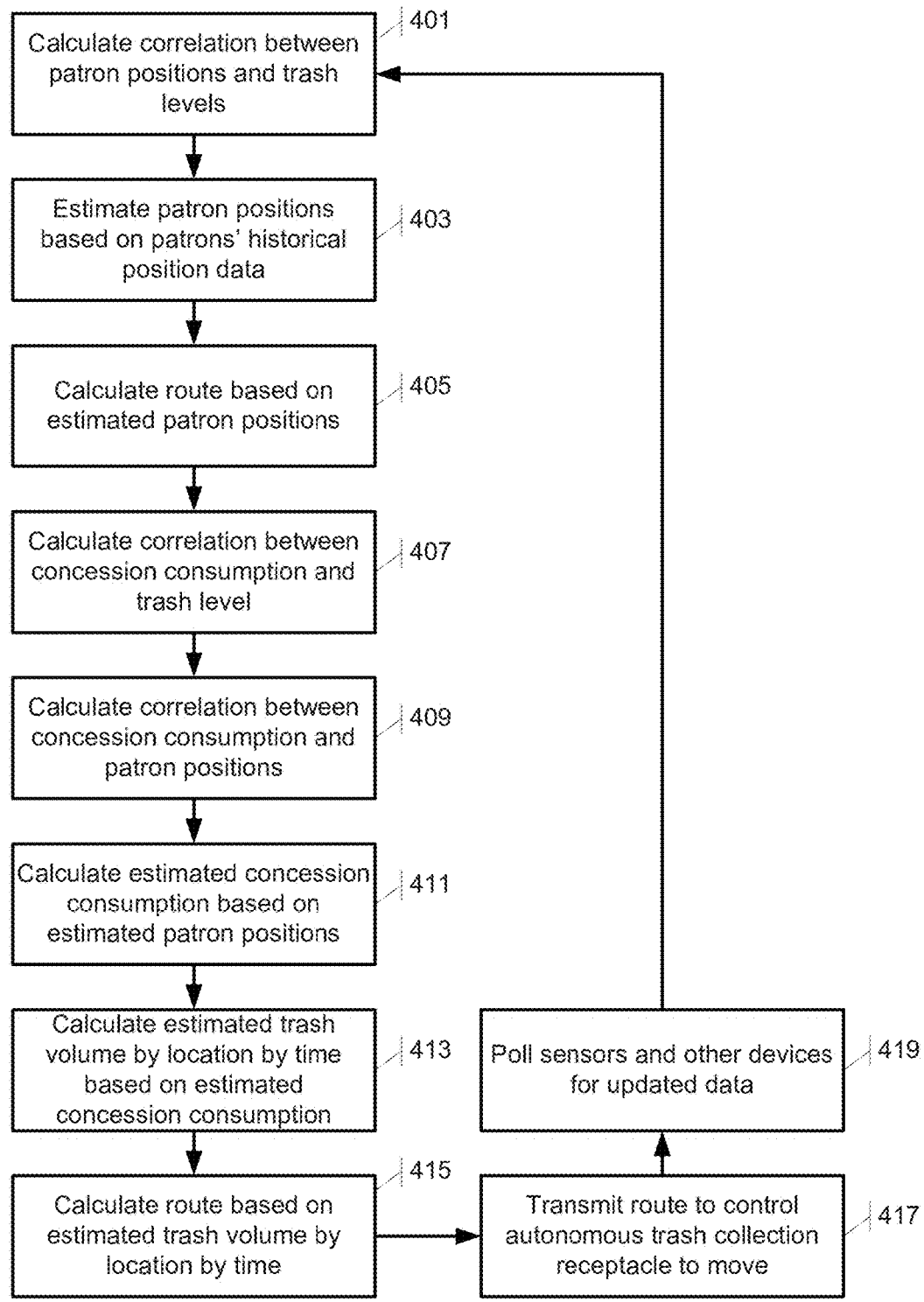

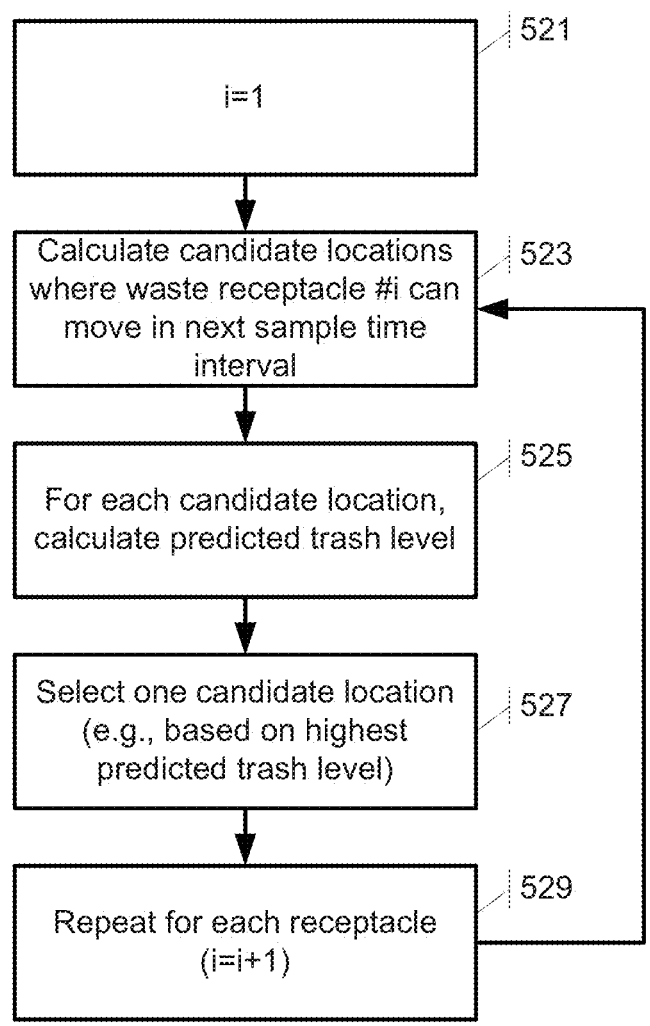

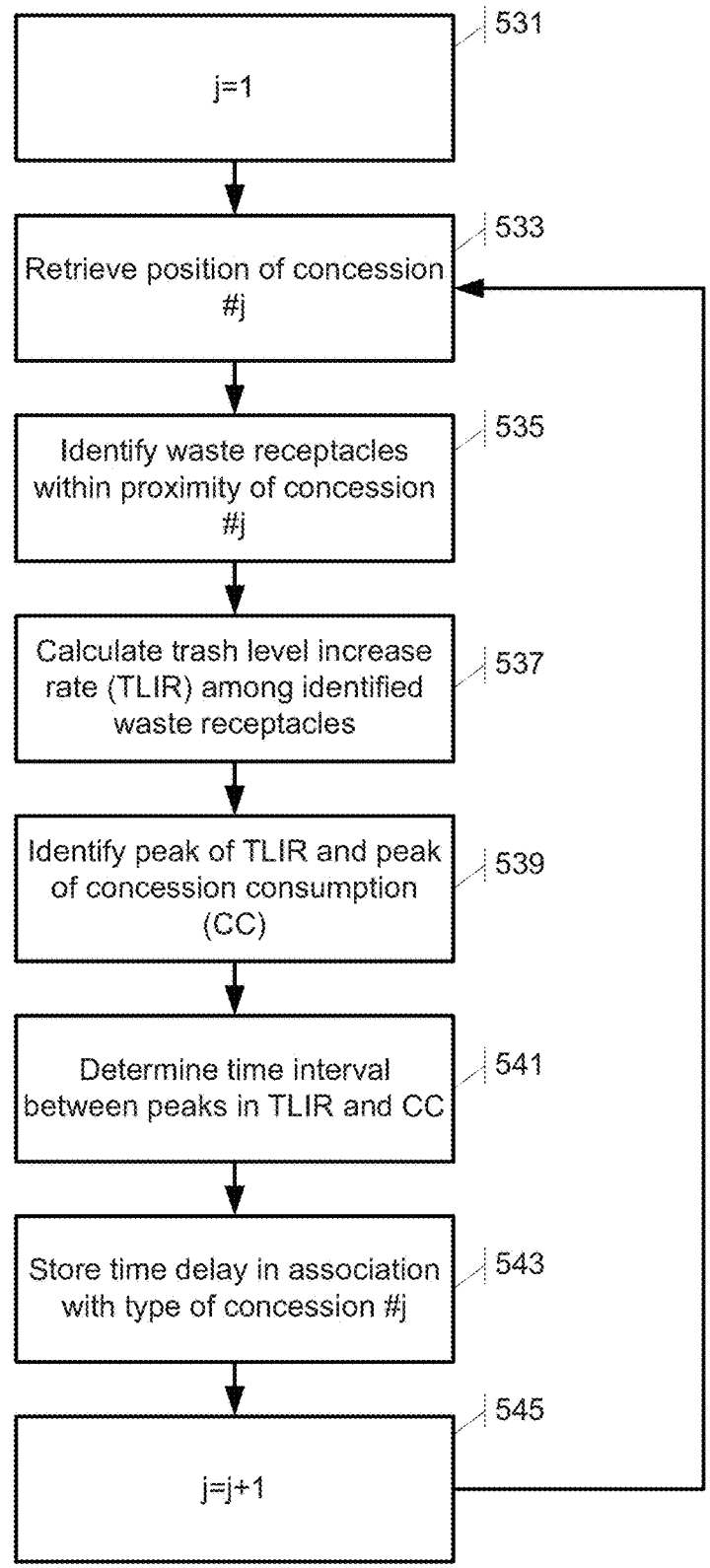

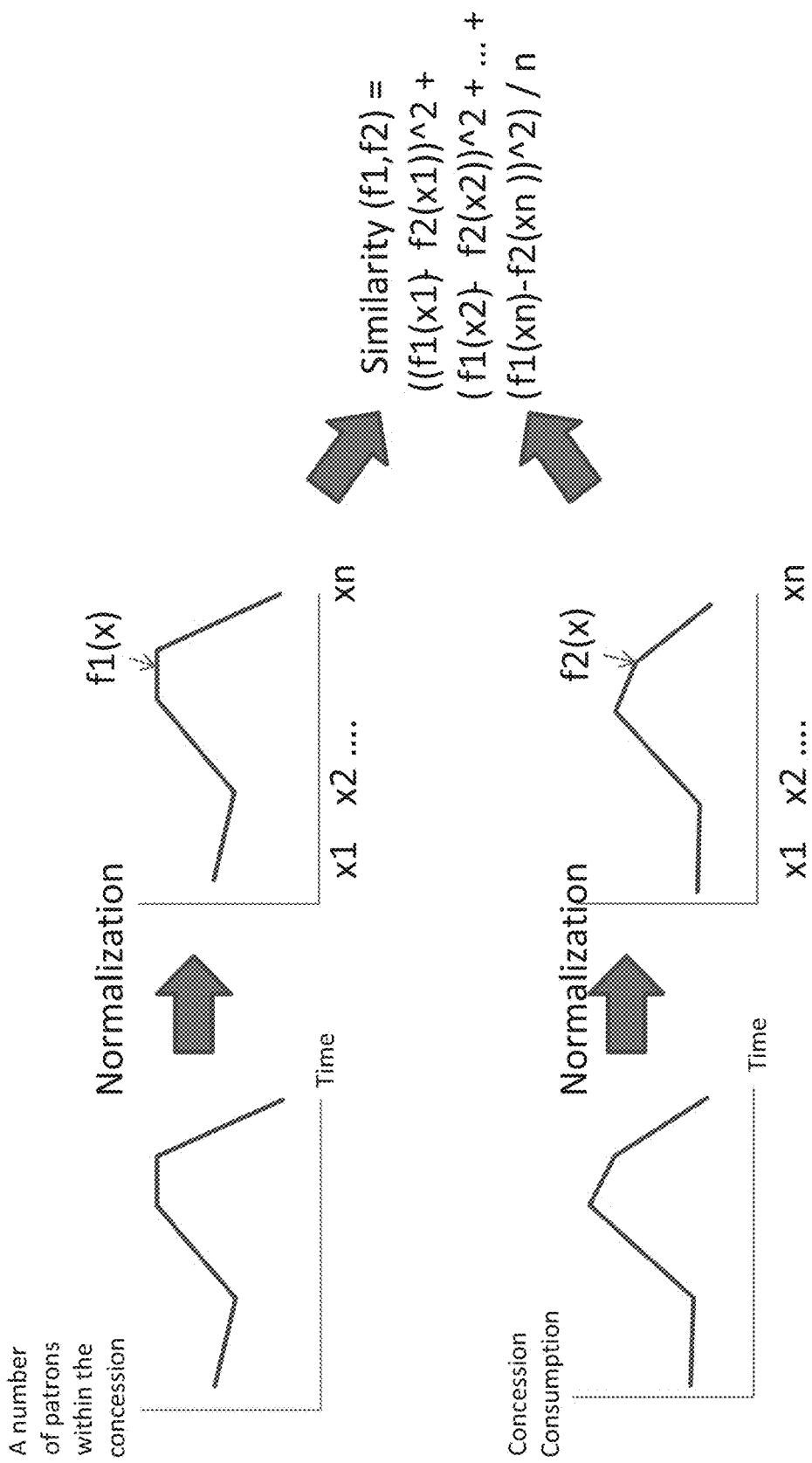

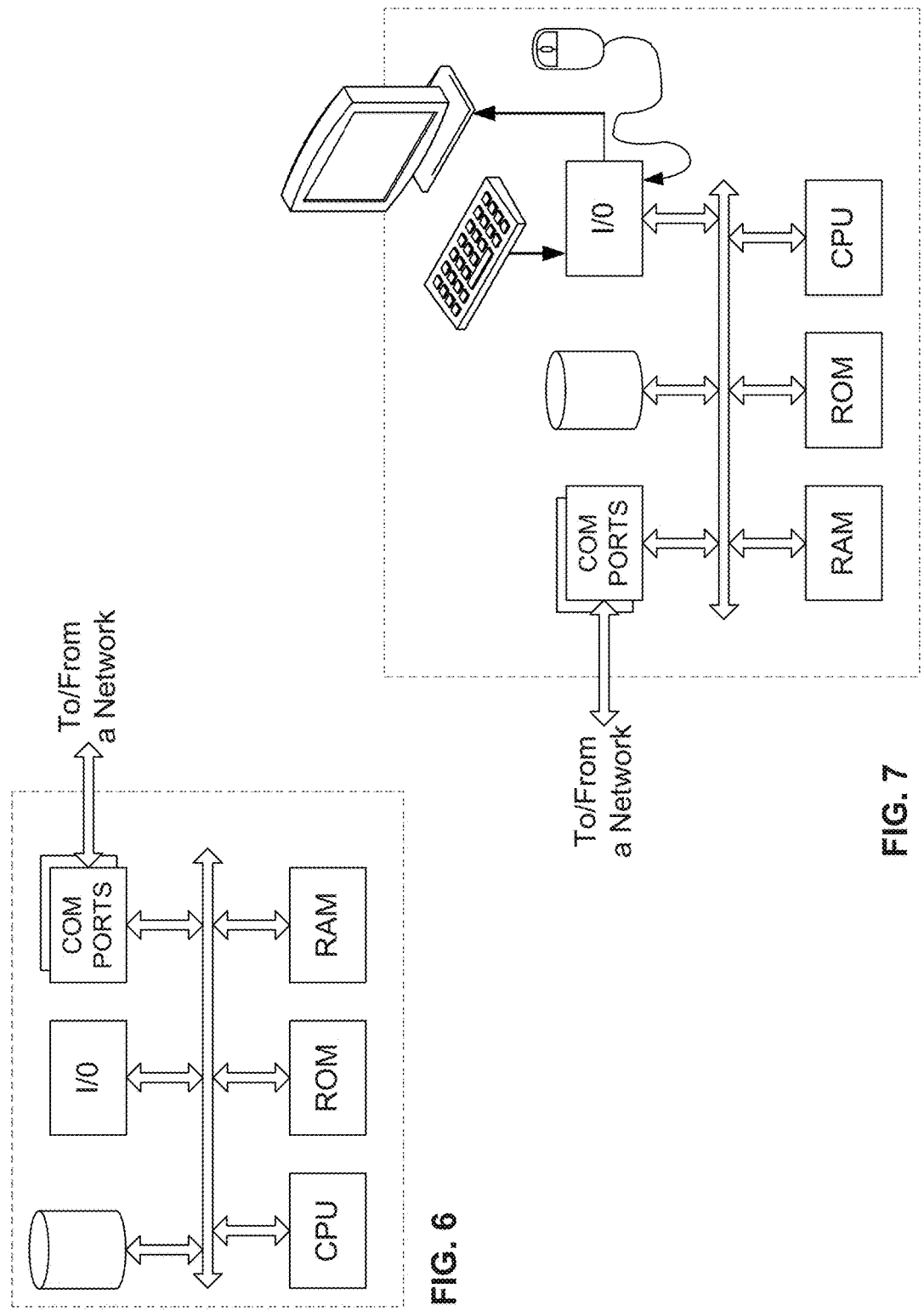

AUTONOMOUS RESORT SANITATION

TECHNICAL FIELD

The present subject matter relates to techniques and equipment to provide autonomous sanitation and waste management services, for example in resorts, amusement parks, or other facilities.

BACKGROUND

Considerable resources are expended in large scale facilities such as resorts and amusement parks to maintain a clean environment for patrons. For example, groundskeeping crews need to place trash cans throughout the facilities and ensure that the trash cans are emptied before reaching capacity. The placement of the trash cans, as well as the volume of trash that they can handle, are key to maintaining good sanitation. Specifically, if trash cans are not placed at locations where they are needed, patrons are likely to litter. Moreover, if trash cans are allowed to reach capacity, additional trash deposited in the cans will overflow into the environment and cause litter. Finally, trash cans commonly need to be located in different locations at different times to account for the different activities in which patrons engage and/or the different locations in which patrons are located.

A need therefore exists for systems that automatically identify optimal locations for trash cans in facilities and that can dynamically and autonomously adjust the placement of trash cans based on time-varying needs of the facilities.

SUMMARY

The teachings herein alleviate one or more of the above noted problems by providing autonomous sanitation and waste management services in resorts, amusement parks, or other facilities.

In accordance with one aspect of the disclosure, a waste management system for use in a facility includes a waste receptacle, a patron sensing subsystem, a concession consumption database, a communication network, and a processing subsystem. The waste receptacle is configured to move autonomously in the facility, to monitor a trash level of the receptacle, and to communicate wirelessly with other components of the waste management system. The patron sensing subsystem is configured to sense patrons within the facility, and to communicate patron sensing information to other components of the waste management system for determining positions of the patrons. The concession consumption database stores concession consumption data indicative of sales performed by concessions in the facility during each of a plurality of time periods. The communication network provides wireless communication services between components of the waste management system including the waste receptacle and the patron sensing subsystem. The processing subsystem is configured to control the waste receptacle to move autonomously in the facility along a route determined according to correlations between concession consumption data stored in the concession consumption database, trash levels monitored by the waste receptacle, and patron positions determined according to the patron sensing information.

In accordance with another aspect of the disclosure, a waste management system for controlling routing of an autonomous waste receptacle in a facility is provided. The waste management system includes the autonomous waste receptacle, a first position tracker, and an autonomous waste management server. The autonomous waste receptacle includes a cavity for storing trash, a trash level sensor for sensing of level of trash stored in the cavity, a motor operative to move the waste receptacle, and a processor operative to control the motor to move the waste receptacle autonomously along a route. The first position tracker is configured to sense a position of the autonomous waste receptacle in the facility. The autonomous waste management server is configured to store, in one or more databases, records of positions of the autonomous waste receptacle and of levels of trash in the autonomous waste receptacle sensed at a plurality of different times; to calculate, based on the stored records of positions of the autonomous waste receptacle and of levels of trash in the autonomous waste receptacle, a route for the autonomous waste receptacle; and to transmit the calculated route to the autonomous waste receptacle to control the autonomous waste receptacle to move the waste receptacle autonomously along the calculated route.

In accordance with another aspect of the disclosure, a waste management method for controlling routing of an autonomous waste receptacle in a facility is provided. The method includes storing, in one or more databases communicatively connected to the autonomous waste receptacle, records of levels of trash sensed at a plurality of different times in the autonomous waste receptacle comprising a cavity for storing trash, a trash level sensor for sensing of the level of trash stored in the cavity, a motor operative to move the waste receptacle, and a processor operative to control the motor to move the waste receptacle autonomously along a route. The method further includes storing, in the one or more databases, records of positions of the autonomous waste receptacle sensed at the plurality of different times by a first position tracker configured to sense a position of the autonomous waste receptacle in the facility. In turn, a route for the autonomous waste receptacle is calculated, in an autonomous waste management server communicatively connected to the one or more databases, based on the stored records of positions of the autonomous waste receptacle and of levels of trash in the autonomous waste receptacle. The calculated route is transmitted from the autonomous waste management server to the autonomous waste receptacle to control the autonomous waste receptacle to move the waste receptacle autonomously along the calculated route.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4 and 5A-5C are high-level flow diagrams showing steps of exemplary autonomous waste management methods that can be implemented by an autonomous waste management system such as that shown in FIG. 3.

FIGS. 5D and 5E are diagrams illustrating certain steps of the autonomous waste management methods shown in FIGS. 4 and 5C.

FIGS. 6 and 7 are simplified functional block diagrams of processing platforms that may be configured for use in components of the autonomous waste management system of FIG. 3.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to autonomous sanitation and waste management. The autonomous sanitation and waste management provides for the automated removal of trash and other waste from a resort, amusement park, or other facility through the use of one or more autonomous waste receptacles such as robotic trash cans. The system, including the one or more autonomous waste receptacles, controls and routes the waste receptacles through the facility to ensure ready availability of trash cans or other waste receptacles at or near locations where trash is generated at different times of day and under different circumstances.

Reference now is made in detail to the examples illustrated in the accompanying drawings and discussed below.

Figure 1A:
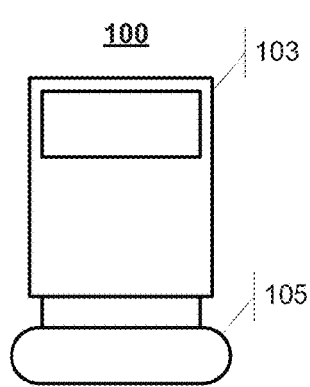
FIGS. 1A and 1B are high-level functional block diagrams of illustrative autonomous waste receptacles for use in autonomous waste management systems.
Figure 1B:
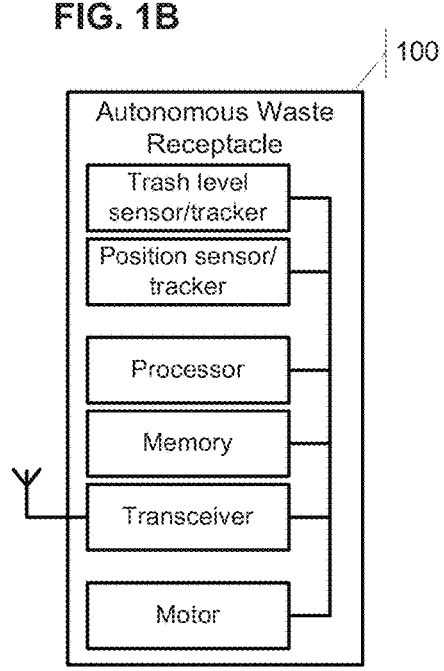

FIGS. 1A and 1B illustrate an autonomous waste receptacle 100 that can be used as part of an autonomous waste management system. The autonomous waste receptacle 100 can take the form of a robotic trash can. In such examples, the autonomous waste receptacle 100 has a body 103 which includes a cavity for receiving and/or storing trash, as shown in FIG. 1A. The body includes at least one opening through which trash or other waste can be received. The autonomous waste receptacle 100 additionally includes tracks 105, wheels, or other appropriate systems for enabling the waste receptacle 100 to autonomously move about a facility. Through the use and control of the tracks 105, the autonomous waste receptacle 100 can autonomously move about the facility to position itself at appropriate location(s) where trash is expected to be generated.

From a functional perspective, the autonomous waste receptacle 100 includes one or more processor(s) and memory(ies) operative to control operation of the receptacle 100 (see, e.g., FIG. 1B). The processor, which may be a microprocessor, serves as a programmable controller for the receptacle 100, in that it controls all operations of the receptacle 100 in accord with programming that it executes, for all normal operations, and for operations involved in the autonomous management of waste under consideration here. The memory includes non-volatile memory storing program instructions for execution on the processor, as well operational data used in performing the various methods described herein. In addition, the receptacle 100 includes sensors such as a trash level sensor/tracker that monitors the level of trash currently present in the receptacle 100 and communicates the monitored level to the processor. The trash level sensor/tracker can be a mechanical, optical, weight, or other sensor. In examples in which receptacle 100 is capable of compacting trash, the trash level sensor/tracker may be connected to the compactor so as to sense a level of the compacted trash whenever the trash compactor is activated.

Additionally, the receptacle 100 includes a position sensor/tracker used to determine the current position of the receptacle 100 in the facility. The position sensor/tracker can take the form of a global positioning system (GPS) unit or other appropriate position-determining unit mounted in or on the receptacle 100 and communicatively connected to the processor. However, while the position sensor/tracker is shown as being mounted in the receptacle 100 in FIG. 1B, the position sensor/tracker can alternatively be a network-based position sensor/tracker, such as a position sensor/tracker configured to determine the position of a receptacle 100 by triangulating the position of the receptacle 100 based on the positions of antennas from which communications to/from the receptacle 100 are received.

The autonomous waste receptacle 100 additionally includes a power source (not shown) such as a battery-based power source used to power its operation including operation of the sensors/trackers, the processor(s), and the like. Finally, the receptacle 100 includes one or more motor(s) operative to actuate the tracks 105, wheels, or other system configured to autonomously move the receptacle 100 around the facility. The motor(s) are under control of the processor, and enable the processor to move the receptacle 100 from a current position to a desired position under control of the processor and under power of the power source.

Figure 2:
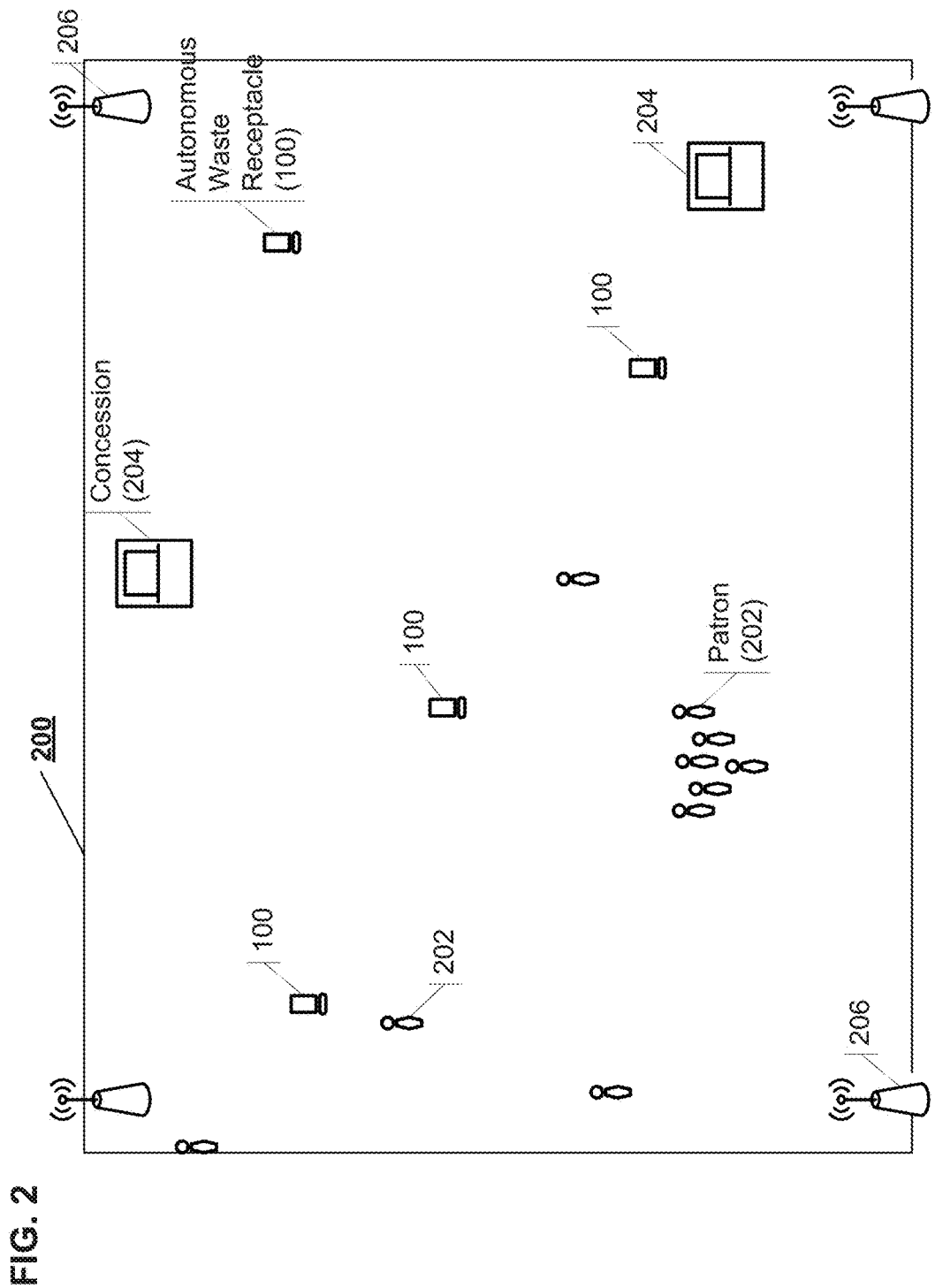
FIG. 2 is a high-level block diagram showing a facility having an associated autonomous waste management system, and showing components of the autonomous waste management system located throughout the facility.

The autonomous waste receptacle 100 operates within a facility 200 such as a resort, theme park, amusement park, or the like. FIG. 2 shows one such illustrative facility 200 in which multiple waste receptacles 100 are located and within which the receptacles 100 can autonomously move. The facility 200 also includes patrons 202, such as persons or guests present in the facility 200 and who may generate waste; concessions 204, such as shops, vendors, vending machines, and other entities in the facility 200 which may provide patrons 202 with products or services; and communication antennas 206 disposed through the facility 200 for supporting communication between elements of the autonomous sanitation system described herein and disposed throughout the facility 200. In some examples, the communication antennas 206 can be used as sensors or the facility 200 can include a separate set of sensors disposed throughout the facility, such as sensors used to sense the positions and/or movement of waste receptacles 100 and patrons 202 in the facility.

The concessions 204 located in the facility 200 are generally at fixed locations within the facility (e.g., in the case of physical store, a food-court, or the like), although in some situations concessions 204 may move within the facility (e.g., in the case of a vending cart). Meanwhile, patrons 202 move throughout the facility 200, and positions of the patrons may be tracked over time. Additionally, patron positions can be estimated based on the patrons' earlier tracked positions, for example to provide predictions of patrons' future positions.

The operation and control of the autonomous waste receptacles 100 may rely in part on components of an autonomous waste management system 300 located within and/or outside and separate of the individual autonomous waste receptacles 100. An illustrative autonomous waste management system 300 is shown in FIG. 3.

Figure 3:
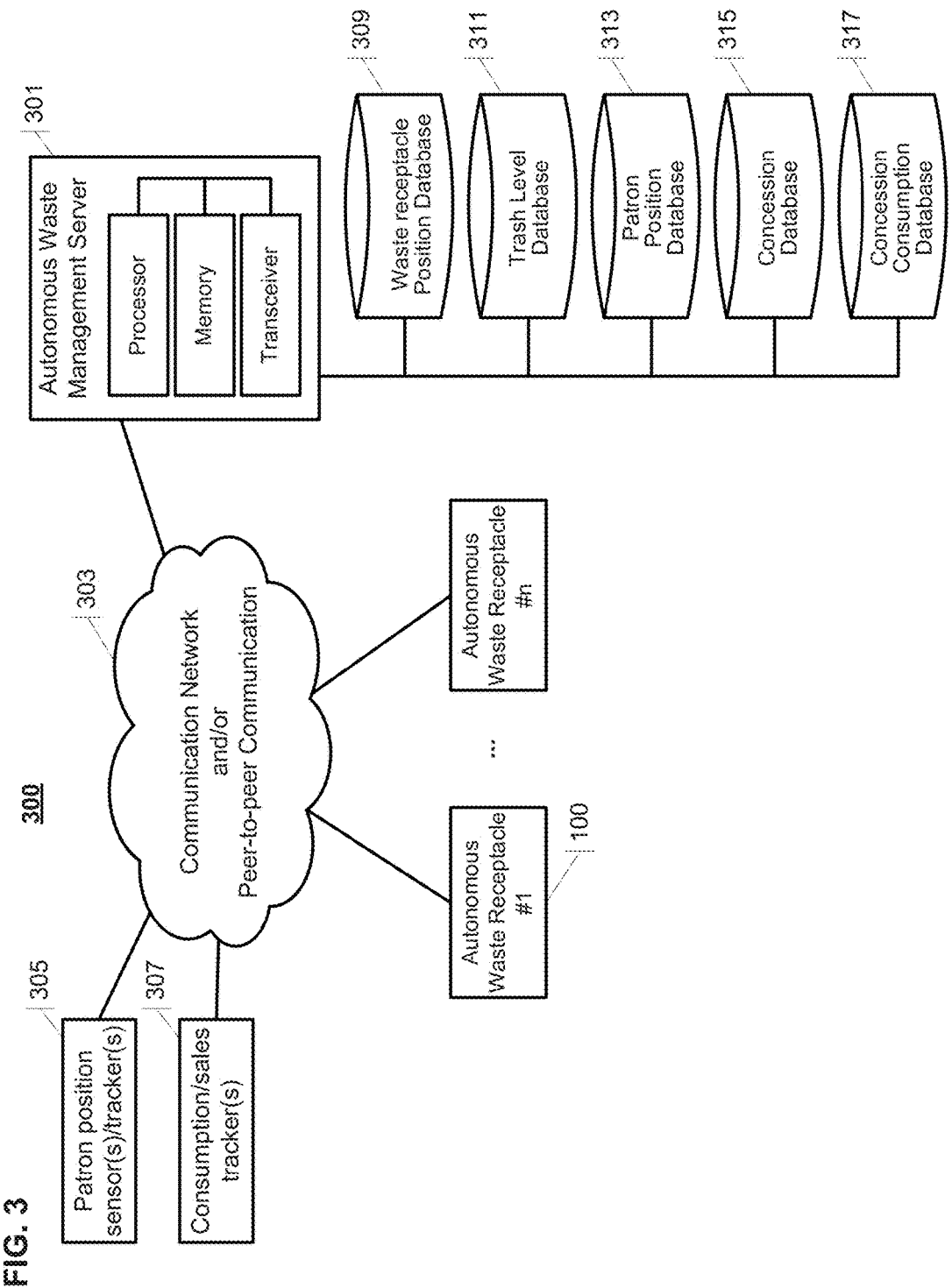
FIG. 3 is a high-level functional block diagram of an autonomous waste management system for use in the facility shown in FIG. 2.

While certain components (e.g., an autonomous waste management server 301) are shown in FIG. 3 as being separate from and/or outside of the individual autonomous waste receptacles 100, those components may in some examples be included within the individual autonomous waste receptacles 100. For example, processing described herein as being performed by the autonomous waste management server 301 may be performed by the processor(s) of an autonomous waste receptacle 100 in certain embodiments. Conversely, although certain components (e.g., position sensor/trackers) are shown in the figures as being located in the individual autonomous waste receptacles 100, those components may in some examples be located separate from the individual autonomous waste receptacles 100.

The autonomous waste management system 300 includes one or more autonomous waste receptacles #1-#n 100 such as the autonomous waste receptacles 100 described above. The system 300 also includes sensors and/or data sources additional to those described above, including a patron sensing subsystem including patron position sensor(s)/tracker(s) 305 used to sense or otherwise determine the positions of patrons 202 within the facility 200. The patron sensing subsystem and patron position sensor(s)/tracker(s) 305 can include GPS units or other appropriate position-determining units carried by guests, such as GPS units of guests' mobile devices or smartphones. In such examples, the guests' devices (e.g., smart phones) may be configured to transmit position data to the autonomous waste management server 301 on a periodic basis (e.g., every minute, every five minutes, or the like) while the patron is in the facility 200. The patron sensing subsystem and patron position sensor(s)/tracker(s) 305 can additionally or alternatively include position sensors/trackers configured to determine the positions of individual guests by, for example, triangulating the positions of the guests based on the known positions of communication antennas 206 used to communicate with the guests or guests' devices or known positions of other position or proximity sensors. The triangulation of positions may be performed based on sensing signals communicated to/from guests' mobile devices or smartphones, guests' RFID-enabled or NFC-enabled devices, bracelets, or the like. The patron sensing subsystem and patron position sensor(s)/tracker(s) 305 can additionally or alternatively include sensors configured to count or otherwise sense and quantify numbers of guests within the sensor(s)/tracker(s) proximity, such as through image-analysis of images captured by the sensor(s)/tracker(s). For instance, the patron position sensor(s)/tracker(s) 305 can make use of cameras (e.g., security or surveillance cameras) mounted throughout the facility 200 to detect and recognize each guest's face in images captured by the cameras through facial recognition, and to determine each guest's location based on the location at which the guest's face is recognized in the images (e.g., based at least in part on known locations of the camera(s) having captured the guest's face). In such an example, each guest's facial data can be captured when the guest enters the facility 200 and used to identify the guest in images captured by the security or surveillance cameras.

The system 300 also includes consumption/sales tracker(s) 307, which are used to populate a database 317 of concession consumption data. The consumption/sales tracker(s) 307 generally include a network of communicatively connected cash registers, payment terminals, vending machine sales terminals, and the like that provide information (e.g., real-time information) on orders and/or sales of items by each concession 204. The consumption/sales tracker(s) 307 generally provide, for each concession 204, a record of the total consumption/order/sale performed by the concession in a preceding time period (e.g., a prior time interval such as a prior 5-minute time period) along with a time stamp (e.g., a time and date stamp) for the time period and identification of the particular concession 204 associated with the consumption/order/sale. In some examples, the consumption/sales tracker(s) 307 includes more precise consumption/order/sale data including identification of one or more items included in the consumption/order/sale. The identification may identify particular items (e.g., a bottle of soda) or identify categories of items (e.g., food, beverage, souvenir, or the like). The information provided by the consumption/sales tracker(s) 307 is stored in the concession consumption database 317 for use in autonomously routing the waste receptacles 100 as described in more detail below. Additionally, a concession database 315 stores, for each concession 204, a position of the concession 204 and a type of the concession (e.g., ice cream concession, beer concession, souvenir shop, or the like).

The autonomous waste management system 300 additionally maintains databases storing various types of data. The databases include a waste receptacle position database 309 storing information on the current and historical (e.g., previous) positions of the waste receptacles 100 in the facility 200; a trash level database 311 storing information on the current and historical (e.g., previous) levels of trash or waste in each waste receptacle 100 (e.g., 0% full, 20% full, or the like); and a patron position database 313 storing information on the current and historical (e.g., previous) positions of the patrons 202 in the facility 200.

Illustrative examples of data stored in each of the databases 309, 311, 313, 315, and 317 are shown in the following Tables 1-5:

TABLE 1

Waste Receptacle Position Database (309)

| Receptacle Identifier | Date/time Stamp | Position |
|---|---|---|
| r1 | 10/22 - 10:00am | (10, 20) |
| r1 | 10/22 - 10:05am | (10, 22) |
| ... | ... | ... |
| r2 | 10/22 - 10:00am | (30, 30) |

TABLE 2

Trash Level Database (311)

| Receptacle Identifier | Date/time Stamp | Trash Level |
|---|---|---|
| r1 | 10/22 - 10:00am | 40% |
| r1 | 10/22 - 10:05am | 42% |
| ... | ... | ... |
| r2 | 10/22 - 10:00am | 0% |

TABLE 3

Patron Postition Database (313)

| Patron Identifier | Date/time Stamp | Position |
|---|---|---|
| p1 | 10/22 - 10:00am | (40, 40) |
| p1 | 10/22 - 10:05am | (40, 45) |
| ... | ... | ... |
| p2 | 10/22 - 10:00am | (0, 10) |

TABLE 4

| Concession Database (315) | | |
|---|---|---|
| Concession Identifier | Concession Type | Position |
| c1 | Ice Cream | (40, 5) |
| c2 | Beer | (70, 60) |
| ... | ... | ... |

TABLE 5

| Concession Consumption Database (317) | | |
|---|---|---|
| Concession Identifier | Date/time Stamp | Consumption in Last Time Interval (e.g., 5 mins) |
| c1 | 10/22 - 10:00am | $ 5 |
| c1 | 10/22 - 10:05am | $20 |
| ... | ... | ... |

Operation of the autonomous waste management system 300 is performed based on processing performed by a processing subsystem having one or more processors including processor(s) included in individual autonomous waste receptacles 100. In addition, the processing subsystem can include one or more autonomous waste management server(s) 301 providing communication and/or processing capabilities for supporting operation of the system. As shown, an autonomous waste management server 301 can include one or more processor(s), memory (including non-transitory memory) for storing programming instructions for execution by the processor(s), and one or more transceiver(s) for communicating with components of the system 300. The autonomous waste management server 301 is also communicatively connected to the databases 309-317 (and/or may be co-located with or include the databases 309-317). Processing performed by the processing subsystem of the autonomous waste management system 300, including processing performed to control autonomous operation of the waste receptacle(s) 100, can be performed in a distributed fashion across processors of the processing subsystem including processors of the receptacle(s) 100 and server(s) 301.

The components of the autonomous waste management system 300 are communicatively interconnected by a communication network 303 and/or by peer-to-peer or other communication links between components of the system 300. In one example, the autonomous waste receptacles 100 are communicatively connected through a wireless network, such as a Wi-Fi based wireless communication network, a mobile wireless network, or the like, providing wireless communication services throughout the facility 200. One or more communication antennas 206, which may include wireless access points, routers, and/or network repeaters, are provided to provide wireless communication coverage of the network 303 throughout the facility 200. The communication antennas 206 can be communicatively connected to each other and to the autonomous waste management server(s) 301 through wired links such as Ethernet links.

The operation of the autonomous waste management system 300 will now be described in relation to the flow diagram of FIG. 4. FIG. 4 is a high-level flow diagram showing steps of a method 400 for autonomous resort sanitation and waste management. The method 400 can enable one or more autonomous waste receptacles 100 to operate automatically and autonomously within a facility 200 to ensure ready availability of trash cans or other waste receptacles at or near locations where trash is generated at all times of day. In this way, the method 400 can be used to ensure that waste is adequately and promptly collected within the facility 200.

The method 400 makes use of current and historical data characterizing the facility 200 and the waste generation and removal needs of the facility 200 that are obtained by the various sensors/trackers provided in the facility 200 and stored in the databases 309-317. Prior to performing step 401, the autonomous waste management system 300 operates to collect current and historical data (e.g., data for current and previous/earlier time periods) from the sensors/trackers provided in the waste receptacles 100 and in the facility 200 and to populate and maintain the databases 309-317 by storing the collected data in the databases 309-317. In particular, the maintaining of the databases 309-317 can include receiving updated data from sensors and systems (e.g., trash level sensors, positions sensors/trackers, cash registers and other consumption data trackers). The updated data can be received automatically on a periodic basis, automatically as it is collected, and/or in response to polling sensors and systems by the processing subsystem (see, e.g., step 419 of method 400). The maintaining of the databases 309-317 can also include computing updated data for storage in the databases, for example by computing updated waste receptacle and patron positions based on received data indicative of the waste receptacles' and patrons' positions in the facility 200.

Figure 5A:
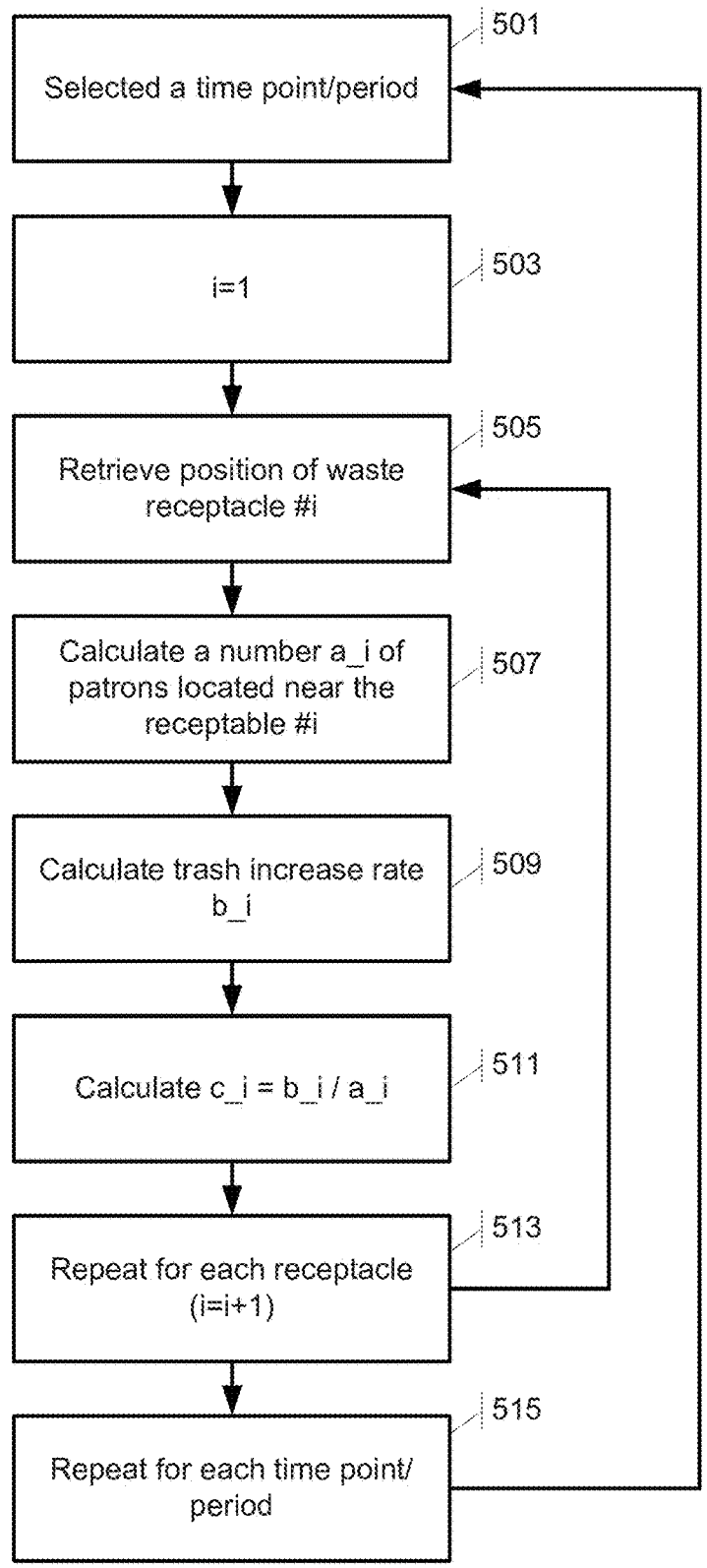

In turn, in step 401, a correlation between the patron position data and trash levels is calculated. The correlation is calculated by the processing subsystem including, generally, processor(s) of the autonomous waste management server 301. The process for computing the correlation coefficient is described in more detail in relation to the method 500 shown in the flow diagram of FIG. 5A.

In accordance with method 500, a time point/period is selected in step 501, and a counter is initialized at i=1 in step 503. In turn, steps 503-515 are repeated for all time points/periods under consideration, such as for all time points/periods for which current and/or historical data is available in the databases 309-317. Note that the granularity of time point (or the length of time periods for which analysis is performed) can be selected according to the level of granularity of data analysis desired. In general, time periods of 5-minute lengths are referenced in the following description (e.g., such that positions are sampled at 5 minute intervals and consumption data is accumulated in 5-minute long samples). However, longer time periods (e.g., 10 minute intervals between samples, or 20 or 60 minute intervals) can be used as well as shorter time periods (e.g., 1 minute intervals). Additionally, for each time point/period selected in step 501, steps 505-513 are repeated n times for all waste receptacles 1-n in use in the facility 200. Specifically, n is a positive integer equal to the number of waste receptacles 100 in operation in the facility 200, and steps 505-513 are repeated n times as the counter i is incremented from 1 to n.

In step 505, the position of waste receptacle #i at the selected time point/period is retrieved from the waste receptacle position database 309 and, in step 507, a number a_i of patrons located near the receptacle is determined based on the patron position data stored for the selected time point/period in database 313. For example, a total count of patrons located within a predetermined distance (e.g., 9 feet) of the receptacle i at the selected time point/period is determined. Additionally, a trash increase rate b_i for receptacle #i is determined in step 509. For example for the selected time point/period t1, the trash increase rate b_i can be determined as b_i=[(trash level in receptacle #i at time (t1+10 min))−(trash level in receptacle #i at time (t1−10 min))]/20 min. The trash increase rate for receptacle #i can be computed based on trash level data stored in the database 311 for the time point/period t1 on a previous day (e.g., the preceding day). In turn, in step 511, the correlation coefficient c_i is computed as c_i=b_i/a_i. The computations of steps 505-511 are repeated for the next receptacles (i=i+1) in step 513 until calculations have been completed for all receptacles 1 through n (1-n). In turn, the computations 503-513 are repeated for the next time points/periods in step 515 until all time points/periods have been considered.

Following completion of step 515, correlation parameters for different locations and different time points are obtained. In one illustrative example, the correlation parameters calculated in step 401 using method 500 may be stored in a table such as the following:

| Date/time Stamp | Location | c_i |
|---|---|---|
| 10/22 - 10:00am | (10, 20) | 0.1 |
| 10/22 - 10:00am | (30, 30) | 0.09 |
| . . . | . . . | . . . |
| 10/22 - 10:05am | (15, 20) | 0.3 |
| . . . | . . . | . . . |

In the illustrative table above, the c_i value calculated for 10/22—10:00 am and location (10, 20) may be computed based on data for receptacle r1 which is located at position (10, 20) at the identified date/time (see, e.g., Table 1, above), while the c_i value calculated for 10/22-10:00 am and location (30, 30) may be computed based on data for receptacle r2 which is located at position (30, 30) at the identified date/time (see, e.g., Table 1, above).

Method 400 proceeds to step 403 in which a position is estimated for each patron based on historical position data for the patrons. For example, a future position can be estimated (or predicted) for each patron, such as a position at which the patron is predicted to be present in the next time point/period. In one example, each patron's future position is estimated based on the patron's current position and on the patron's immediate previous position by performing a linear projection of the patron's immediate previous position through the patron's current position. The estimate is performed based on current and prior patron position data stored in the patron position database 313. In one example, for patron p1 at time 10/22-10:05 am, the patron's current position (40, 45) and immediate previous position (40, 40) are retrieved. Furthermore, by linearly projecting the patron's movement from (40, 40) to (40, 45) forward into the next sample time point/period, the patron's position at 10/22—10:10 am (i.e., following the next 5-minute time sample interval) is estimated to be (40, 50). The estimation of each patron's position into the next sample time interval (e.g., next future time interval) is performed for each patron in step 403.

In step 405, the autonomous waste management server 301 calculates a route for each autonomous waste receptacle 100 based on estimated the patron positions. More particularly, the route is calculated based on the predicted patron volume (i.e., total number of patrons) at different locations in the next sample time interval, which is determined based on the estimated patron positions calculated in step 403. The route for each receptacle 100 is also calculated based on the correlation parameters calculated in step 401. In detail, the route can be calculated based on method 520 shown in FIG. 5B.

In accordance with method 520, a counter is initialized at i=1 in step 521. In turn, steps 523-529 are repeated for all waste receptacles 1-n in the facility 200 as the counter is incremented from 1 to n. In step 523, all candidate locations to which waste receptacle #i can move in the next sample time interval (e.g., in the next 5 minute interval) are calculated. Specifically, the candidate locations can be determined based on the receptacle's current position (e.g., as indicated in the waste receptacle position database 309), based on the receptacle's known movement capabilities (e.g., a maximum movement speed of 2 meters/minute), and based on any known obstacles or other features of the facility 200 (e.g., presence of a wall or structure preventing movement in a particular direction, presence of a paved walkway enabling movement in another direction, or the like). In step 525, for each candidate location determined in step 523, a predicted trash level is computed. The predicted trash level is calculated based on an estimated number of patrons near the candidate location (determined based on the estimated patron positions calculated in step 403), a correlation parameter calculated in step 401, and a current trash level. Specifically, the predicted trash level is calculated as: predicted_trash_level=(estimated number of patrons near the candidate location)*(closest correlation parameter by time & location)+current_trash_level. The estimated number of patrons near the candidate location is determined by counting a total number of patrons having estimated positions (as determined in step 403) within a predetermined distance (e.g., 9 feet) from the candidate location. The closest correlation parameter is determined by retrieving all correlation parameters calculated in step 401 that are associated with locations within the predetermined distance (e.g., 9 feet) from the candidate location and associated with the same time of day (e.g., 10:05 am), and computing an average of the retrieved correlation parameters. The current_trash_level is the current trash level in waste receptacle #i or the most recently measured, monitored, or reported trash level in waste receptacle #i. For example, the most recent trash level for receptacle #i stored in the trash level database 311 is generally used as the current_trash_level. In step 527, one candidate location is selected from among all of the candidate locations based on the result of step 525. In one example, the candidate location with the highest predicted trash level is selected such that the autonomous trash receptacle #i can be moved to the location of greatest predicted trash level. In step 529, the processes of steps 523-527 are repeated for every other waste receptacle 2-n that is operating in the facility 200.

As part of step 405, the waste receptacles 100 may be controlled to follow the calculated route. For example, once the one candidate location is selected for a waste receptacle in step 527, the autonomous waste management server 301 may transmit the route or one candidate location to the waste receptacle 100 so as to control the waste receptacle 100 to autonomously move along the route. Upon receiving the route or one candidate location, the waste receptacle 100 may automatically and autonomously move to the one candidate location.

Figure 5D:
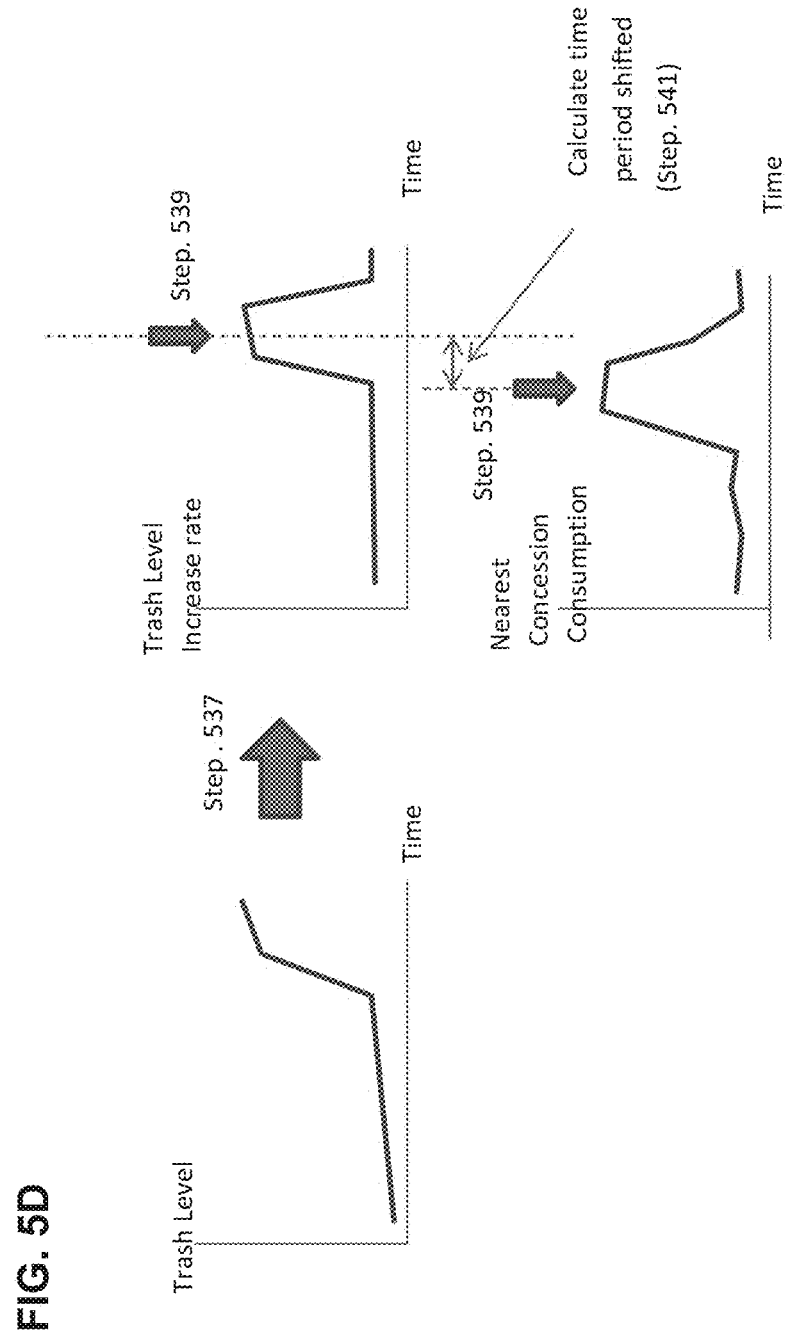

In step 407, correlations between concession consumption and trash level is computed. The correlation is computed based on the data stored in the concession consumption database 317 and data stored in the trash level database 311 based on proximity between positions of a waste receptacle 100 and a concession 204 and based on time stamp data. In detail, the correlation can be calculated based on method 530 shown in FIG. 5C. FIG. 5D provides plots of one illustrative example of method 530.

In accordance with method 530, a counter is initialized at j=1 in step 531. In turn, steps 533-545 are repeated for all concessions 1-m in the facility 200 as the counter j is incremented to m (m being an integer corresponding to the total number of concessions 204 in operation in the facility). In step 533, the position of concession #j is retrieved from the concession database 315. For example, the position of concession #1 may be identified as (40, 5) in the database (see, e.g., Table 4 above). In step 535, the waste receptacle(s) 100 within proximity (e.g., within a predetermined distance, such as 12 ft) of concession #j are identified based on the record of positions of waste receptacles 100 stored in the waste receptacle position database 309. In step 537, a trash level increase rate (TLIR) is calculated from among the records of trash levels of the waste receptacles within proximity of concession #j. The TLIR can be computed as a first derivative of the total trash level in the waste receptacles over time. For example, FIG. 5D shows an illustrative plot of total trash level and of the TLIR for one concession. In step 539, a time of peak in the TLIR is identified (see, e.g., FIG. 5D). Additionally, a time of peak of the concession consumption (CC) metric for the concession #j is identified (e.g., based on the concession consumption data for concession #j stored in the concession consumption database 317). In steps 541 and 543, a time interval between the identified peaks in TLIR and CC is determined and stored in association with the type of the concession #j (see, e.g., FIG. 5D). The time interval, which corresponds to a time delay between the time of purchase of an item and the generation of trash or waste as a result of the purchase, is used as a measure of the correlation calculated in step 407. In step 545, the processes of steps 533-543 are repeated for each further concession 2-m by incrementing j and proceeding to step 533.

The time interval length or time delay stored in step 543 can be stored in a table such as the following:

| Concession Type | Time delay | Distance from concession to waste receptacle |
|---|---|---|
| Beer | 5 min | 10 ft |
| Tacos | 15 min | 11 ft |
| Souvenirs | 1 min | 8 ft |
| ... | ... | ... |

In the illustrative values provided in the above table, the correlation between concession consumption and trash level indicates that in the case of a beer (or other beverage selling) concession, an expected delay of 5 minutes occurs between the sale of an item and trash being generated in a nearby waste receptacle as a result of the sale (e.g., it takes 5 minutes for the person to consume the item and throw out the item's container). In contrast, in the case of a concession selling tacos, an expected delay is of 15 minutes, while in the case of a concession selling souvenirs (e.g., a doll), an expected delay of only 1 minute occurs between a sale and wrapping paper or other packaging being disposed of in a nearby waste receptacle.

In step 409, a correlation coefficient between concession consumption and patron positions is calculated. The calculated correlation coefficient is indicative of a degree of similarity between the two parameters. The calculation of the correlation coefficient is illustratively shown in FIG. 5E. The correlation coefficient is separately computed for each different type of concession type, and data for one illustrative type of concession is shown in FIG. 5E. As shown, the number of patrons within the concession or proximate to the concession (e.g., within a predetermined distance (e.g., 12 ft) from the concession) is obtained, plotted, and normalized such that a peak number of patrons is set to the normalized value of 1. The data on the number of patrons within or proximate to the concession is obtained by retrieving patron position data stored in database 313 and identifying all patrons located at positions within (or proximate to) the concession at each time point. The positions located within (or proximate to) the concession are known based on the concession position data stored in the concession database 315. Additionally, data on concession consumption for the concession is obtained and is normalized such that a peak amount of consumption is set to the normalized value of 1. The data on concession consumption can be retrieved from the concession consumption database 317. In turn, the normalized number of patrons data (referenced as $f1(t)$, where t is a time variable) and the normalized concession consumption (referenced as $f2(t)$, where t is a time variable) are used to calculated the similarity between the two datasets: similarity($f1$, $f2$)=$[(f1(t1)-f2(t1))^2+(f1(t2)-f2(t2))^2+ \ldots +(f1(tn)-f2(tn))^2]/n$ over all time points $[t1, \ldots, tn]$. A similarity value of 0 (zero) indicates that the two datasets are fully correlated, a low value of similarity indicates that the two datasets are highly correlated (e.g., the two dataset vary in synchrony), while a larger similarity value indicates that the two datasets are uncorrelated.

In one example, the correlation coefficient between the concession consumption data and the number of patrons data (corresponding to the similarity calculation detailed above) may provide the following results, by concession type:

| Concession Type | Degree of Similarity (correlation) |
|---|---|
| Beer | 1600 |
| Tacos | 200 |
| Souvenirs | 10 |
| ... | ... |

In the foregoing table, a relatively high degree similarity (e.g., indicated by the low similarity measure of 10) is found in the case of souvenir concessions, indicating that the number of patrons in a souvenir concession is highly correlated with the level of consumption in the concession (e.g., if many patrons are present sales are generally high while, conversely, sales are generally low when few patrons are present). In contrast, consumption in a beer concession is not highly correlated (as indicated by the high similarity measure of 1600) with the number of patrons.

In the description above, the correlation coefficient between concession consumption and the number of patrons is based on a count of the number of patrons in (or near) the concession. In some examples, the autonomous waste management system 300 may gather more detailed information on individual patrons and may make use of the detailed patron information to calculate additional correlations. In one example, the system 300 may store basic patron data including whether a patron is an adult or a child. In such an example, the number of patrons located within (or in proximity to) the concession can be counted separately for adult patrons and child patrons. In turn, the similarity (or correlation) between each patron type and the concession consumption can be calculated to determine whether the concession consumption is more highly correlated with the total number of patrons, the number of adult patrons, or the number of child patrons. In this way, in one example, the correlation data may be used to determine that consumption in a beer-type concession is more highly correlated with numbers of adult patrons; consumption in a souvenir-selling concession is more highly correlated with numbers of child patrons; and consumption in a taco-selling (or other food selling) concession is more highly correlated with a total number of patrons. The more detailed correlation data can then be used in the following steps 411 in a manner similar to that described below.

In step 411, the autonomous waste management server 301 calculates estimated concession consumption for each concession. The estimated (or predicted) concession consumption may correspond to an estimate of the consumption predicted to take place at the concession in the next time period (e.g., next 5 minute interval). The estimated concession consumption is calculated based on the estimated patron positions calculated in step 403 and on the correlations between concession consumption and patron positions calculated in step 409. For example, the estimated concession consumption can be calculated by determining the estimated (or expected) patron volume within (or in proximity to) a concession based on the estimated patron positions (e.g., by determining the number of patrons estimated to be within or in proximity to the concession in the next time period). In turn, the determined estimated (or expected) patron volume within (or in proximity to) the concession is multiplied by the correlation parameter (or similarity parameter) computed for the concession in step 409 to obtain the estimated (or expected) concession consumption in the next time period.

In turn, in step 413, the estimated concession consumption data is used to estimate waste volume by location based on the estimated concession consumption. The waste volume expected (or estimated) to be produced at different locations is calculated based on the estimated concession consumption determined in step 411 at each location and the correlation between concession consumption and trash level determined in step 407. For example, the estimated waste volume in an area proximate to a concession can be calculated by time shifting the estimated concession consumption for the concession by the time delay parameter used as a measure of correlation calculated for the concession type of the concession in step 407. Hence, by time shifting the estimated concession consumption of step 411 by the time delay of step 407, an estimate of waste volume to be generated at each location in the next time period is obtained.

In turn, in step 415, a route for the autonomous waste receptacles 100 is calculated based on the trash volume estimated by location by time as calculated in step 413. The route for each autonomous waste receptacle 100 can be calculated in a manner analogous to that described in relation to step 405 and method 520 (FIG. 5B) described above on the basis of the estimated trash volume calculated in step 413. As in step 405, the route determination can involve identifying the candidate location at which the highest trash volume is estimated to be generated in the next time period. In turn, in step 417, the waste receptacles 100 may be controlled to follow the calculated route or move to the identified candidate location. For example, the autonomous waste management server 301 may transmit to each waste receptacle 100 the corresponding route or candidate location so as to control the waste receptacles 100 to autonomously move along the routes. Upon receiving the route or one candidate location, each waste receptacle 100 may automatically and autonomously move to the one candidate location.

Note that the route for the autonomous waste receptacles 100 calculated in step 415 can, in some situations, be based directly on the trash levels sensed in each autonomous waste receptacle 100. For example, upon determining that the trash level sensed in an autonomous waste receptacle 100 exceeds a predetermined threshold (e.g., exceeds 95% full), the autonomous waste management server can be configured to calculate (and transmit to the autonomous waste receptacle in step 417) a route for the autonomous waste receptacle 100 to be emptied when the sensed level of trash exceeds the predetermined threshold. The route may be a route to a groundskeeping location at which dumpsters or other large trash containers are located in the facility 200 and into which the autonomous waste receptacles 100 can be emptied.

The process described above in relation to steps 401-417 can be continuously repeated so as to continuously route the autonomous trash receptacles 100 through the facility 200 over time. For this purpose, in step 419, the sensors and devices of the autonomous waste management system 300 may be polled to obtain updated data (e.g., updated position, trash level, and consumption data) for the current time period. In turn, processing can return to step 401 so as to route the waste receptacles 100 through the next time period.

The foregoing description has focused on one illustrative sequence of steps for controlling autonomous waste receptacles and more generally performing autonomous waste management for a facility. The ordering of the steps described above is illustrative, and the order of various steps can be changed without departing from the scope of the disclosure. Moreover, certain steps can be eliminated, and other steps added, without departing from the scope of disclosure. In one example, step 405 can be eliminated in some examples such that only one routing step (e.g., step 415) remains in the method 400. In another example, step 419 can be performed continuously such that the autonomous waste management system 300 receives updated sensing data at all times (e.g., even while steps 401-417 are being performed).

As shown by the above discussion, functions for providing the autonomous sanitation and waste management service, via an autonomous waste management system 300 such as that described herein, may be implemented on processing subsystems including processor(s) connected for data communication via the communication network 303 and operating in autonomous waste receptacles 100 and/or in waste management server(s) 301 shown in FIG. 3. Although special purpose devices may be used, such devices also may be implemented using one or more hardware platforms intended to represent a general class of data processing device commonly used to run "client" and "server" programming so as to implement the autonomous waste management functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for implementing the autonomous waste management method 400. The software code is executable by the general-purpose computer that functions as the autonomous waste management server and/or that controls autonomous waste receptacle devices. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for autonomous waste management in essentially the manner performed in the implementations discussed and illustrated herein.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A waste management system for use in a facility, the waste management system comprising:
   a waste receptacle configured to move autonomously in the facility, to monitor a trash level of the receptacle, and to communicate wirelessly with other components of the waste management system;
   at least one patron sensor configured to sense patrons within the facility, and to communicate patron sensing information to other components of the waste management system for determining positions of the patrons;
   a concession consumption database storing concession consumption data indicative of sales performed by concessions in the facility during each of a plurality of time periods;
   a communication network providing wireless communication services between components of the waste management system including the waste receptacle and the at least one patron sensor; and
   at least one processor configured to control the waste receptacle to move autonomously in the facility along a route determined according to correlations between concession consumption data stored in the concession consumption database, trash levels monitored by the waste receptacle, and patron positions determined according to the patron sensing information.

2. The waste management system of claim 1, wherein the at least one processor is configured to perform functions to:

maintain a waste receptacle position database identifying, for each of a plurality of time periods, the position of the waste receptacle in the facility during the time period;

maintain a trash level database identifying, for each of the plurality of time periods, the trash level of the waste receptacle as monitored by the waste receptacle;

maintain a patron position database identifying, for each of the plurality of time periods, the positions of patrons in the facility during the time period based on the patron sensing information communicated by the at least one patron sensor;

maintain the concession consumption database; and maintain a concession database identifying the positions of the concessions in the facility.

3. The waste management system of claim 1, wherein the at least one processor is configured to perform functions to:

calculate a correlation between a rate of increase in trash level of the waste receptacle, determined according to the monitored trash level of the waste receptacle, and a number of patrons positioned near the waste receptacle, determined according to positions of patrons determined based on the patron sensing information;

estimate positions of patrons in one time period according to the positions of the patrons determined according to the patron sensing information for previous time periods;

calculate a route for the waste receptacle in the facility according to an estimated trash level for the waste receptacle in the one time period calculated based on the estimated positions of patrons in the one time period and based on the calculated correlation between the rate of increase in trash level of the waste receptacle and the number of patrons positioned near the waste receptacle; and control the waste receptacle to move autonomously in the facility along the calculated route.

4. The waste management system of claim 1, wherein the at least one processor is configured to perform functions to:

calculate a correlation between concession consumption data and a rate of increase in trash level of the waste receptacle, determined according to the monitored trash level of the waste receptacle;

calculate a correlation between concession consumption data and a number of patrons positioned near each concession in the facility, determined according to positions of patrons determined according to the patron sensing information;

calculate estimated concession consumption in one time period according to estimated positions of the patrons determined according to the patron sensing information for previous time periods and according to the calculated correlation between concession consumption data and the number of patrons positioned near each concession in the facility;

calculate an estimated trash volume for the waste receptacle in the one time period based on the estimated concession consumption and the calculated correlation between concession consumption data and the rate of increase in trash level of the waste receptacle; and calculate a route for the waste receptacle in the facility according to trash levels for the waste receptacle in the one time period estimated based on the estimated positions of patrons in the one time period and based on the calculated correlation between the rate of increase in trash level of the waste receptacle and the number of patrons positioned near the waste receptacle; and control the waste receptacle to move autonomously in the facility along the calculated route.

5. The waste management system of claim 1, wherein the at least one processor includes a waste management server communicatively connected to the waste receptacle, the at least one patron sensor, and the concession consumption database across the communication network.

6. The waste management system of claim 1, wherein the at least one patron sensor comprises a network of sensors disposed at known locations throughout the facility, each sensor of the network of sensors is configured to sense patrons located proximate to the sensor, and the at least one patron sensor is configured to determine positions of patrons based on the known locations of the sensors and the patrons sensed by each sensor.

7. The waste management system of claim 1, wherein the at least one patron sensor receives patron position information from an electronic device carried by each patron.

8. A waste management system for controlling routing of an autonomous waste receptacle in a facility, the system comprising:

the autonomous waste receptacle comprising:
a cavity for storing trash;
a trash level sensor for sensing of level of trash stored in the cavity;
a motor operative to move the waste receptacle; and
a processor operative to control the motor to move the waste receptacle autonomously along a route;

a first position tracker configured to sense a position of the autonomous waste receptacle in the facility; and an autonomous waste management server configured to:
store in one or more databases records of positions of the autonomous waste receptacle and of levels of trash in the autonomous waste receptacle sensed at a plurality of different times;
calculate, based on the stored records of positions of the autonomous waste receptacle and of levels of trash in the autonomous waste receptacle, a route for the autonomous waste receptacle; and transmit the calculated route to the autonomous waste receptacle to control the autonomous waste receptacle to move the waste receptacle autonomously along the calculated route.

9. The waste management system of claim 8, wherein the autonomous waste management server is configured to calculate and transmit to the autonomous waste receptacle a route for the autonomous waste receptacle to be emptied when the sensed level of trash exceeds a predetermined threshold.

10. The waste management system of claim 8, further comprising:

a second position tracker configured to sense positions of patrons in the facility, wherein the autonomous waste management server is configured to store in the one or more databases records of positions of the patrons sensed at the plurality of different times, and wherein the autonomous waste management server is configured to calculate the route for the autonomous waste receptacle based on correlations between positions of the patrons and levels of trash in the autonomous receptacle at the plurality of different times.

11. The waste management system of claim 10, wherein the autonomous waste management server is further configured to estimate, based on the stored records of positions of the patrons sensed at the plurality of different times, positions of the patrons at a time other than the plurality of different times, and wherein the autonomous waste management server is configured to calculate the route for the autonomous waste receptacle based on the estimated positions of the patrons at the time other than the plurality of different times.

12. The waste management system of claim 10, wherein the one or more databases further store records of concession consumption data indicative of sales performed by concessions in the facility at the plurality of different times, and wherein the autonomous waste management server is configured to calculate the route for the autonomous waste receptacle based on correlations between concession consumption data and levels of trash in the autonomous receptacle at the plurality of different times.

13. The waste management system of claim 12, wherein the autonomous waste management server is configured to:

calculate the correlations between the concession consumption data and levels of trash in the autonomous waste receptacle at the plurality of different times;

calculate correlations between the concession consumption data and positions of the patrons sensed at the plurality of different times;

estimate concession consumption data at a time other than the plurality of different times based on estimated positions of patrons at the time other than the plurality of different times and the calculated correlation between the concession consumption data and positions of the patrons; and estimate a trash volume based on the estimated concession consumption data and the calculated correlation between the concession consumption data and levels of trash in the autonomous waste receptacle, and wherein the autonomous waste management server calculates the route for the autonomous waste receptacle based on the estimated trash volume.

14. A waste management method for controlling routing of an autonomous waste receptacle in a facility, the method comprising:

storing, in one or more databases communicatively connected to the autonomous waste receptacle, records of levels of trash sensed at a plurality of different times in the autonomous waste receptacle comprising a cavity for storing trash, a trash level sensor for sensing of the level of trash stored in the cavity, a motor operative to move the waste receptacle, and a processor operative to control the motor to move the waste receptacle autonomously along a route;

storing, in the one or more databases, records of positions of the autonomous waste receptacle sensed at the plurality of different times by a first position tracker configured to sense a position of the autonomous waste receptacle in the facility;

calculating, in an autonomous waste management server communicatively connected to the one or more databases, based on the stored records of positions of the autonomous waste receptacle and of levels of trash in the autonomous waste receptacle, a route for the autonomous waste receptacle; and transmitting, from the autonomous waste management server to the autonomous waste receptacle, the calculated route to control the autonomous waste receptacle to move the waste receptacle autonomously along the calculated route.

15. The waste management method of claim 14, further comprising:

storing in the one or more databases, based on positions of patrons in the facility sensed by a second position tracker communicatively connected to the one or more databases, records of positions of the patrons sensed at the plurality of different times, wherein the calculating of the route for the autonomous waste receptacle comprises calculating the route for the autonomous waste receptacle based on correlations between positions of the patrons and levels of trash in the autonomous receptacle at the plurality of different times.

16. The waste management method of claim 15, further comprising:

estimating, based on the stored records of positions of the patrons sensed at the plurality of different times, positions of the patrons at a time other than the plurality of different times, wherein the calculating of the route for the autonomous waste receptacle comprises calculating the route for the autonomous waste receptacle based on the estimated positions of the patrons at the time other than the plurality of different times.

17. The waste management method of claim 15, further comprising:

storing, in the one or more databases, records of concession consumption data indicative of sales performed by concessions in the facility at the plurality of different times, wherein the calculating of the route for the autonomous waste receptacle comprises calculating the route for the autonomous waste receptacle based on correlations between concession consumption data and levels of trash in the autonomous receptacle at the plurality of different times.

18. The waste management method of claim 17, further comprising:

calculating the correlations between the concession consumption data and levels of trash in the autonomous waste receptacle at the plurality of different times;

calculating correlations between the concession consumption data and positions of the patrons sensed at the plurality of different times;

estimating concession consumption data at a time other than the plurality of different times based on estimated positions of patrons at the time other than the plurality of different times and the calculated correlation between the concession consumption data and positions of the patrons; and estimating a trash volume based on the estimated concession consumption data and the calculated correlation between the concession consumption data and levels of trash in the autonomous waste receptacle, wherein the calculating of the route for the autonomous waste receptacle comprises calculating the route for the autonomous waste receptacle based on the estimated trash volume.

* * * * *